(12) United States Patent
Peng et al.

(10) Patent No.: US 9,099,138 B2
(45) Date of Patent: Aug. 4, 2015

(54) OPTICAL DEVICES INCLUDING LAYERS THAT WRAP THE NEAR FIELD TRANSDUCER (NFT)

(71) Applicant: SEAGATE TECHNOLOGY LLC, Cupertino, CA (US)

(72) Inventors: Chubing Peng, Eden Prairie, MN (US); Hua Zhou, Plymouth, MN (US)

(73) Assignee: Seagate Technology LLC, Cupertino, CA (US)

( * ) Notice: Subject to any disclaimer, the term of this patent is extended or adjusted under 35 U.S.C. 154(b) by 34 days.

(21) Appl. No.: 14/135,910

(22) Filed: Dec. 20, 2013

(65) Prior Publication Data

US 2015/0179199 A1 Jun. 25, 2015

(51) Int. Cl.
*G11B 11/24* (2006.01)
*G11B 5/60* (2006.01)
*G11B 5/00* (2006.01)

(52) U.S. Cl.
CPC ...... *G11B 5/6082* (2013.01); *G11B 2005/0021* (2013.01)

(58) Field of Classification Search
None
See application file for complete search history.

(56) References Cited

U.S. PATENT DOCUMENTS

| | | | |
|---|---|---|---|
| 5,987,046 A | 11/1999 | Kobayashi | |
| 6,009,064 A * | 12/1999 | Hajjar | 369/112.24 |
| 6,574,257 B1 * | 6/2003 | Thronton et al. | 372/46.01 |
| 7,852,587 B2 * | 12/2010 | Albrecht et al. | 360/59 |
| 8,098,547 B2 * | 1/2012 | Komura et al. | 369/13.33 |
| 8,200,054 B1 | 6/2012 | Li | |
| 8,295,010 B2 * | 10/2012 | Shimazawa et al. | 360/125.31 |
| 8,456,966 B1 * | 6/2013 | Shi et al. | 369/13.33 |
| 8,675,457 B1 * | 3/2014 | Hirata et al. | 369/13.33 |
| 8,787,130 B1 * | 7/2014 | Yuan et al. | 369/13.33 |
| 2002/0067690 A1 * | 6/2002 | Tominaga et al. | 369/285 |
| 2006/0090178 A1 | 4/2006 | Stipe | |
| 2006/0143635 A1 | 6/2006 | Liu | |
| 2008/0239541 A1 | 10/2008 | Shimazawa | |
| 2010/0061200 A1 * | 3/2010 | Shimazawa et al. | 369/13.33 |
| 2010/0074062 A1 * | 3/2010 | Kamijima et al. | 369/13.14 |
| 2010/0091618 A1 * | 4/2010 | Schabes et al. | 369/13.02 |
| 2010/0165822 A1 | 7/2010 | Balamane | |
| 2010/0290323 A1 * | 11/2010 | Isogai et al. | 369/13.24 |
| 2010/0321815 A1 | 12/2010 | Zhou | |
| 2011/0013497 A1 * | 1/2011 | Sasaki et al. | 369/13.24 |
| 2013/0114385 A1 * | 5/2013 | Nakai et al. | 369/44.11 |

* cited by examiner

*Primary Examiner* — Peter Vincent Agustin
(74) *Attorney, Agent, or Firm* — Mueting, Raasch & Gebhardt, P.A.

(57) ABSTRACT

A device having an air bearing surface (ABS), the device including a near field transducer (NFT), the NFT having at least a portion thereof at the ABS; a first wrap layer, the first wrap layer surrounding at least a portion of the NFT, the first wrap layer having a thickness of not greater than about 30 nanometers (nm), and the first wrap layer being made of a material that has a refractive index (n) that is not greater than 2.0; a second wrap layer, the second wrap layer surrounding at least a portion of the first wrap layer, the second wrap layer having a thickness that is not greater than 100 nm, and the second wrap layer being made of a material that has a refractive index (n) that is at least about 1.9; and a top cladding layer surrounding at least a portion of the second wrap layer, the top cladding layer being made of a material that has a refractive index (n) that is not greater than 2.0.

20 Claims, 5 Drawing Sheets

OPTICAL DEVICES INCLUDING LAYERS THAT WRAP THE NEAR FIELD TRANSDUCER (NFT)

BACKGROUND

In thermally assisted magnetic/optical recording, information bits are recorded to a storage layer of a storage media at elevated temperatures. Generally, a spot or bit on the storage medium is heated to reduce its coercivity sufficiently so that an applied magnetic field or optical write signal can record data to the storage medium. Current methods of heating the storage media include directing and focusing energy onto the storage media. Different and more advantageous methods and devices for focusing the energy are needed in order to decrease the size of the heated spot in order to increase the storage density of the storage media.

SUMMARY

A device having an air bearing surface (ABS), the device including a near field transducer (NFT), the NFT having at least a portion thereof at the ABS; a first wrap layer, the first wrap layer surrounding at least a portion of the NFT, the first wrap layer having a thickness of not greater than about 30 nanometers (nm), and the first wrap layer being made of a material that has a refractive index (n) that is not greater than 2.0; a second wrap layer, the second wrap layer surrounding at least a portion of the first wrap layer, the second wrap layer having a thickness that is not greater than 100 nm, and the second wrap layer being made of a material that has a refractive index (n) that is at least about 1.9; and a top cladding layer surrounding at least a portion of the second wrap layer, the top cladding layer being made of a material that has a refractive index (n) that is not greater than 2.0.

A device having an air bearing surface (ABS), the device including a near field transducer (NFT), the NFT having at least a portion thereof at the ABS; a waveguide core layer adjacent at least the NFT, the core layer being made of a material that has an index of refraction between about 1.9 and 4.0; a first wrap layer, the first wrap layer surrounding at least a portion of the NFT, the first wrap layer having a thickness of not greater than about 30 nanometers (nm), and the first wrap layer being made of a material that has a refractive index (n) that is not greater than 2.0; a second wrap layer, the second wrap layer surrounding at least a portion of the first wrap layer, the second wrap layer having a thickness that is not greater than 100 nm, and the second wrap layer being made of a material that has a refractive index (n) that is greater than that of the material of the first wrap layer; and a top cladding layer surrounding at least a portion of the second wrap layer, the top cladding layer being made of a material that has a refractive index (n) that is not greater than 2.0.

A device having an air bearing surface (ABS), the device including a near field transducer (NFT), the NFT having at least a portion thereof at the ABS; a waveguide core layer adjacent at least the NFT, the core layer being made of a material that has an index of refraction between about 1.9 and 4.0; a core-NFT space positioned between the NFT and the core layer; a first wrap layer, the first wrap layer having a thickness of not greater than about 30 nanometers (nm), the first wrap layer being made of a material that has a refractive index (n) that is not greater than 2.0, and the first wrap layer surrounding all of the NFT except the side by the waveguide core layer; a second wrap layer, the second wrap layer surrounding at least a portion of the first wrap layer, the second wrap layer having a thickness that is not greater than 100 nm, and the second wrap layer being made of a material that has a refractive index (n) that is greater than that of the material of the first wrap layer; and a top cladding layer surrounding at least a portion of the second wrap layer, the top cladding layer being made of a material that has a refractive index (n) that is not greater than 2.0.

The above summary of the present disclosure is not intended to describe each disclosed embodiment or every implementation of the present disclosure. The description that follows more particularly exemplifies illustrative embodiments. In several places throughout the application, guidance is provided through lists of examples, which examples can be used in various combinations. In each instance, the recited list serves only as a representative group and should not be interpreted as an exclusive list.

BRIEF DESCRIPTION OF THE FIGURES

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

Disclosed devices can offer advantages for heat assisted magnetic recording (HAMR). Such advantages can include providing more efficient transfer of energy from an energy source to the magnetic storage media to be heated, a smaller focal point at the point of heating, or some combination thereof. In some embodiments, disclosed devices can be used within other devices or systems, such as magnetic recording heads, more specifically, HAMR heads, or disc drives that include such devices.

Figure 1:
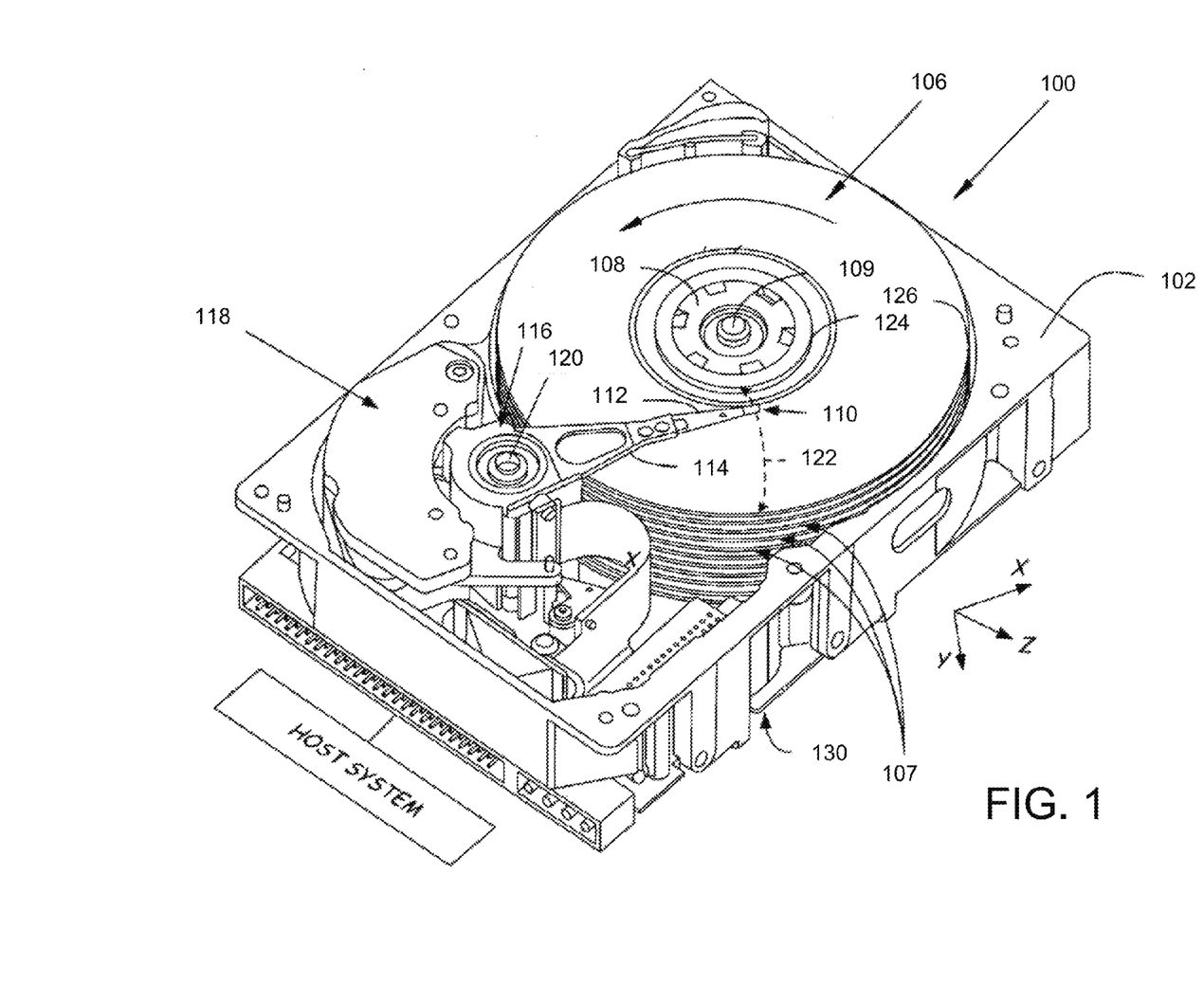
FIG. 1 is an isometric view of a system including a disc drive.

FIG. 1 is an isometric view of a disc drive 100 in which disclosed devices such as disclosed optical devices may be useful. Disc drive 100 includes a housing with a base 102 and a top cover (not shown). Disc drive 100 further includes a disc pack 106, which is mounted on a spindle motor (not shown) by a disc clamp 108. Disc pack 106 includes a plurality of individual discs, which are mounted for co-rotation about central axis 109. Each disc surface has an associated disc head slider 110 which is mounted to disc drive 100 for communication with the disc surface. In the example shown in FIG. 1, sliders 110 are supported by suspensions 112 which are in turn attached to track accessing arms 114 of an actuator 116. The actuator shown in FIG. 1 is of the type known as a rotary moving coil actuator and includes a voice coil motor (VCM), shown generally at 118. Voice coil motor 118 rotates actuator 116 with its attached heads 110 about a pivot shaft 120 to position heads 110 over a desired data track along an arcuate path 122 between a disc inner diameter 124 and a disc outer diameter 126. Voice coil motor 118 is driven by servo electronics 130 based on signals generated by heads 110 and a host computer (not shown).

In general, the disc head slider 110 supports a recording head that can include disclosed optical devices. Disclosed optical devices included in the disc head slider 110 can be utilized to direct focused energy onto a surface of a disc 107 of the disc pack 106 to provide heat-assisted recording. A control circuit included with the servo electronics 130 or co-located with the servo electronics 130 along a bottom portion of the disc drive 100 may be used to control a position of the slider 110 and the associated read/write head relative to one of the individual discs 107 of the disc pack 106.

Figure 2:
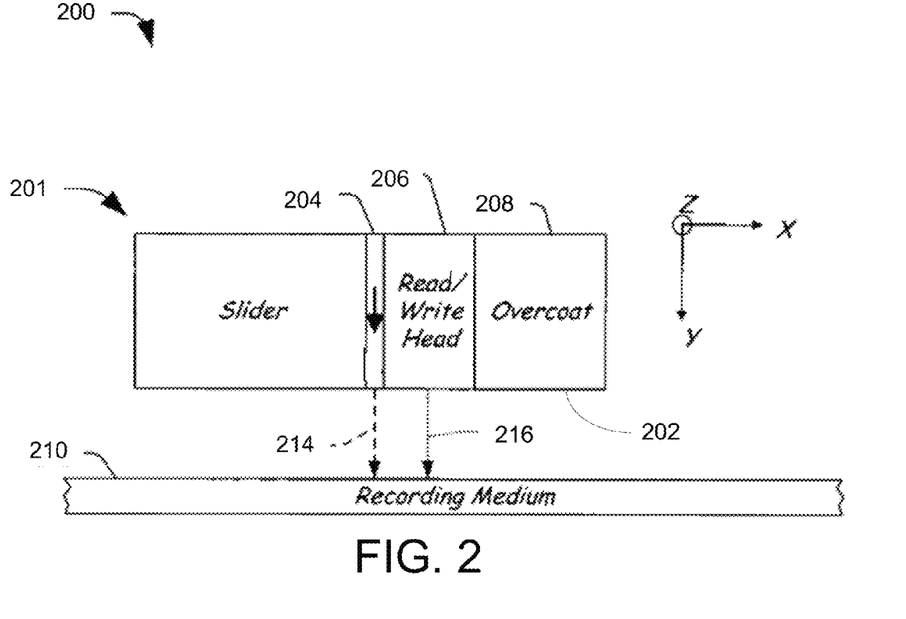
FIG. 2 is a block diagram of a particular illustrative embodiment of a recording head including a waveguide in communication with an illustrative recording medium.

FIG. 2 is a block diagram of a particular illustrative embodiment of a system 200 including a recording head 201 having an optical device 204 such as those depicted herein. The system 200 includes a recording medium 210 located perpendicular to a Y-axis of the optical device 204. The recording head 201 includes an air-bearing slider 202 that flies over the surface of the recording medium 210 and that is adapted to be adjusted in the X-direction and the Z-direction and that maintains a fly-height over the surface of the recording medium 210 in the Y-direction based on airflow. The air-bearing slider 202 is coupled to a read/write head 206, which is adjacent to the optical device 204. The optical device 204 focuses evanescent waves energy toward the surface of the recording medium 210. The recording head 201 can optionally include overcoat layer 208 that functions to protect the read/write head 206.

In a particular embodiment, the optical device directs focused energy 214 onto the surface of the recording medium 210 to heat a local area of the recording medium 210 to reduce the coercivity of the local area. Concurrently, the read/write head 206 directs a recording field 216 onto the recording medium 210 in the heated local area to record data to the recording medium.

Figure 3A:
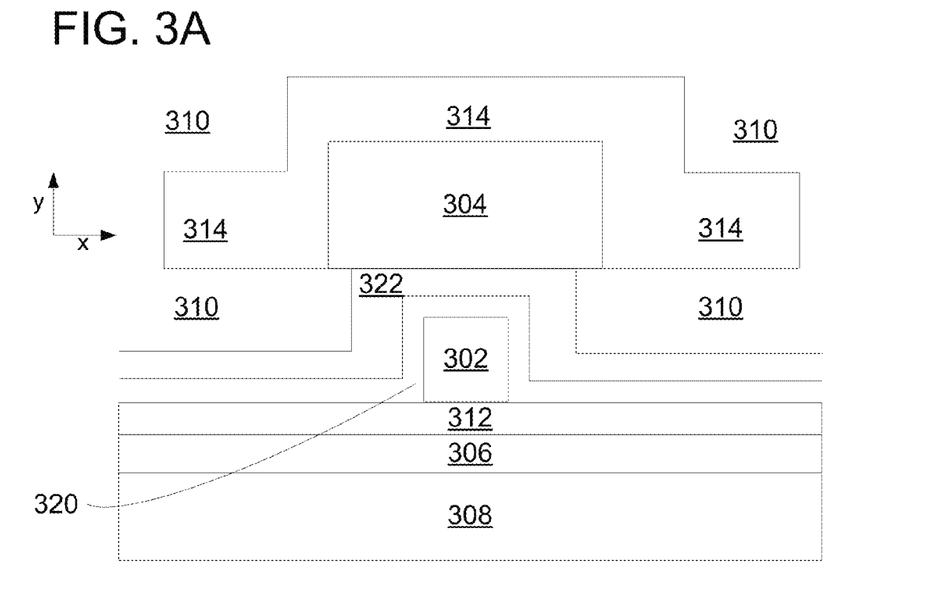
FIG. 3A illustrates a cross section at the air bearing surface (ABS) of an exemplary disclosed device.
Figure 3B:
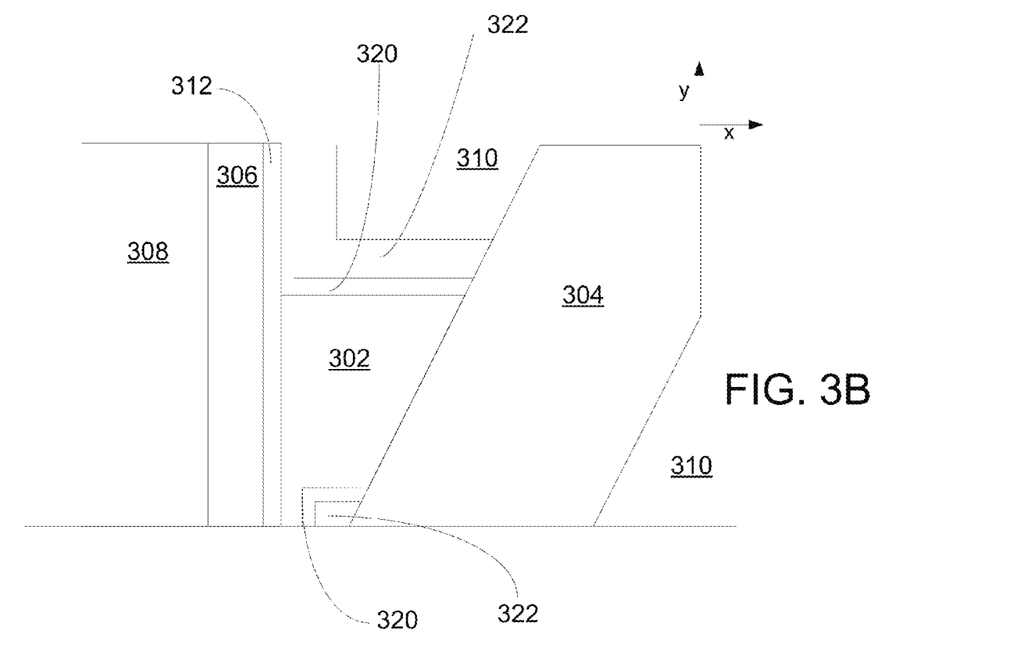
FIG. 3B illustrates a cross section in the z-y plane of the exemplary disclosed device.

FIG. 3A illustrates a cross section at the air bearing surface (ABS) of an exemplary disclosed device, and FIG. 3B illustrates a cross section in the z-y plane. Disclosed devices include a NFT 302. The NFT 302 can be a single structure that functions as only a near field transducer (NFT), a single structure that functions as both a near field transducer and a heat sink or it can be a multi-part structure which as a whole functions as a near field transducer and a heat sink. As seen in FIG. 3B, the NFT 302 depicted in this embodiment includes an attached heat sink. In some embodiments, the NFT can be a peg/disc type of NFT, which can also be referred to as a lollipop structure, a gap type of NFT, or a funnel-type NFT for example. The near field transducer function of the NFT functions to condense incoming light rays to a location on the recording medium (210 in FIG. 2), while the heat sink function of the NFT functions to dissipate heat, which is generated by the NFT function, away from the NFT structure.

Disclosed devices also include a magnetic pole 304. The magnetic pole 304 can generally function as a write pole in a read-write head. Although the examples discussed herein depict perpendicular magnetic recording heads, it will be appreciated that the embodiments depicted herein may also be used in conjunction with other types of recording heads and/or storage media where it may be useful to employ heat assisted magnetic recording. Disclosed devices can also include a heat sink. FIG. 3A includes heat sink 314. Exemplary heat sinks can include materials that can function to dissipate excess heat generated by the NFT. Exemplary heat sinks can be made of materials that are thermally conductive. Exemplary materials can include, for example chromium (Cr). In some embodiments, a heat sink 314 can be made of Cr for example.

Disclosed devices also include a waveguide core layer 306. It should be noted that at least the waveguide core layer 306, the bottom cladding layer 308, and the top cladding layer 310 can be considered as part of a waveguide. The bottom cladding layer 308 can generally be positioned adjacent the waveguide core layer 306.

In some embodiments, the material of the waveguide core layer 306 may have a refractive index of about 1.9 to about 4.0. In contrast, the material of the either or both of the bottom and top cladding layers 308 and 310 may have a refractive index of about 1.2 to about 2.0. By forming the waveguide core layer 306 with a higher refractive index than the cladding layers, the waveguide core layer 306 is able to more efficiently guide a propagating or guided electromagnetic planar waveguide mode by total internal reflection. In some embodiments, by increasing the ratio of the waveguide core layer 306 refractive index to the cladding layers' refractive index (for the refractive index ranges stated herein), the energy of the propagating or guided mode can be more greatly confined within the waveguide core layer 306. As used herein, the term propagating or guided electromagnetic planar waveguide mode generally refers to optical modes which are presented as a solution of the eigenvalue equation, which is derived from Maxwell's equations subject to the boundary conditions generally imposed by the waveguide geometry.

In some embodiments, the waveguide core layer 306 may be formed of a material such as, for example, $Ta_2O_5$, $TiO_2$, ZnSe, ZnS, Si, SiN, GaP, GaN, $Hf_2O_3$, $Y_2O_3$, diamond, or combinations thereof. In some embodiments, the waveguide core layer 306 may be formed of a material such as, for example $Ta_2O_5$, SiN, $TiO_2$, diamond, or combinations thereof.

In some embodiments, the bottom cladding layer 308 may be formed of a material such as, for example $SiO_2$, $MgF_2$, $Al_2O_3$, porous silica, or combinations thereof. In some embodiments, the bottom cladding layer 308 can be formed of a material that has advantageous properties, for example, the material can have advantageous corrosion resistant properties. Corrosion resistance can be important because the bottom cladding layer 308 is exposed to the air bearing surface (ABS) of the device. In some embodiments, the bottom cladding layer can be made of $SiO_2$, for example. In some embodiments, the top cladding layer 310 can have a refractive index of not greater than 2.0. In some embodiments, the top cladding layer 310 may be formed of a material such as, for example $SiO_2$, $MgF_2$, $Al_2O_3$, $Y_2O_3$, porous silica, or combinations thereof. The top and bottom cladding layers can be the same or different materials.

Disclosed devices include a first wrap layer 320 and a second wrap layer 322. The first wrap layer 320 is adjacent to or directly adjacent to the NFT 302. The second wrap layer 322 is adjacent to or directly adjacent to the first wrap layer 320. The first wrap layer 320 can be described as wrapping at least a portion of the NFT 302. More specifically, the first wrap layer 320 can be described as being adjacent all of the surface of the NFT 302 except that which is adjacent the core-NFT space (CNS) 312. The CNS can generally be made of materials such as $Ta_2O_5$ or $SiO_2$ for example. The second wrap layer 322 can be more specifically described as surrounding or being adjacent to all non-NFT adjacent surfaces of the first wrap layer 320. The NFT 302, first wrap layer 320 and second wrap layer 322 could also be described as saying that the first wrap layer 320 partially encases the NFT 302 and the second wrap layer 322 encases the first wrap layer 320.

The first wrap layer 320 can be described as a thin low index of refraction material layer. The first wrap layer 320 is intended to pull the field out of the NFT, thereby minimizing the light absorption in the NFT and enhancing the efficiency of the NFT. As the first wrap layer 320 becomes thicker, the benefit that is gained by its presence diminishes.

In some embodiments, the first wrap layer 320 can have a thickness that is at least 5 nm. In some embodiments, the first wrap layer 320 can have a thickness that is at least 10 nm. In some embodiments, the first wrap layer 320 can have a thickness that is at least 20 nm. In some embodiments, the first wrap layer 320 can have a thickness that is not greater than 50 nm. In some embodiments, the first wrap layer 320 can have a thickness that is not greater than 30 nm. In some embodiments, the first wrap layer 320 can have a thickness of 10 nm, for example.

In some embodiments, the first wrap layer 320 can be made of a material that has a low index of refraction. In some embodiments, the first wrap layer 320 can be made of a material that has an index of refraction that is not greater than 2.0. In some embodiments, the first wrap layer 320 can be made of a material that has an index of refraction that is not greater than 1.8. In some embodiments, the first wrap layer 320 can be made of a material that has an index of refraction that is not greater than 1.5. In some embodiments, the first wrap layer 320 may be formed of a material such as, for example $SiO_2$, $MgF_2$, $Al_2O_3$, $Y_2O_3$, AlN, porous silica, or combinations thereof. In some embodiments, the first wrap layer 320 can be formed of a material that has advantageous properties, for example, the material can have advantageous corrosion resistant properties. Corrosion resistance can be important because a portion of the first wrap layer 320 is exposed to the ABS of the device. In some embodiments, the first wrap layer 320 can be made of $SiO_2$, for example.

The second wrap layer 322 can be described as having a higher index of refraction and being thicker than the first wrap layer 320. The second wrap layer 322 is intended to push the waveguide mode field into the NFT for excitation.

In some embodiments, the second wrap layer 322 can have a thickness that is at least 30 nm. In some embodiments, the second wrap layer 322 can have a thickness that is at least 40 nm. In some embodiments, the second wrap layer 322 can have a thickness that is at least 50 nm. In some embodiments, the second wrap layer 322 can have a thickness that is at least 70 nm. In some embodiments, the second wrap layer 322 can have a thickness that is not greater than 120 nm. In some embodiments, the second wrap layer 322 can have a thickness that is not greater than 100 nm.

In some embodiments, the second wrap layer 322 can be made of a material that has a higher index of refraction than the first wrap layer 320. In some embodiments, the second wrap layer 322 can be made of a material that has a higher index of refraction than the first wrap layer 320 but not significantly higher than the waveguide core layer 306. If the second wrap layer 322 has an index of refraction that is too high, the field gets directed into the pole, increasing the absorption and decreasing the efficiency. In some embodiments, the second wrap layer 322 can be made of a material that has an index of refraction that is at least 1.9. In some embodiments, the second wrap layer 322 can be made of a material that has an index of refraction that is not greater than 3.7. In some embodiments, the second wrap layer 322 may be formed of a material such as, for example $Ta_2O_5$, $SiON_x$, $SiOTa_x$, Si, or $Y_2O_3$. In some embodiments, the second wrap layer 322 can be formed of a material that has advantageous properties, for example, the material can have advantageous corrosion resistant properties. Corrosion resistance can be important because a portion of the second wrap layer 322 is exposed to the ABS of the device. In some embodiments, the second wrap layer 322 can be made of $Ta_2O_5$, for example.

The top cladding layer 310 in disclosed devices also functions along with the first wrap layer 320 and the second wrap layer 322. The top cladding layer 310 (which could also be referred to as third layer in the context of the first wrap layer and the second wrap layer) has a low index of refraction and functions as a cladding layer. It is intended to cut the field into the NFT heat sink as well as the magnetic pole to lower the absorption in the heat sink and pole.

Disclosed devices can also include a light source. A light source can be configured to generate light, which is directed into the waveguide. More specifically, the light source and waveguide are configured so that light from the light source is received by the waveguide and directed out the waveguide into the NFT. Other devices and structures not depicted herein could be utilized to direct the light from the light source into the waveguide. Exemplary types of structures or devices can include, for example, solid immersion mirrors including parabolic mirrors for example, mode index lenses, and three-dimensional channel waveguides. Exemplary types of light sources can include, for example laser diodes, light emitting diodes (LEDs), edge emitting laser diodes (EELs), vertical cavity surface emitting lasers (VCSELs), and surface emitting diodes.

Examples

A specific exemplary device having a configuration like that shown in FIGS. 3A and 3B was modeled. The device specifically included a 125 nm thick $Ta_2O_5$ core 306 with an index of refraction n=2.09. Both top 310 and bottom 308 cladding layers used a low index silica ($SiO_2$). The lollipop NFT, heat-sink, and magnetic pole were placed inside the top cladding 310. The NFT 302 was placed 15-nm away from the core 306, creating a core-NFT spacing (CNS) of 15 nm. In this model, it was assumed that the CNS was made of $Ta_2O_5$ or $SiO_2$. The lollipop NFT consisted of a gold (n=0.189+j 5.42) cylinder having a 200 nm diameter and a peg. The peg was 45-nm wide (along the z direction) and 35 nm thick (along the x direction). The peg height (along the y direction), PHT, varied from 5 to 30 nm. The magnetic pole was FeCo (n=2.94+j 3.41), sloped at an angle of 30° (from the waveguide plane). The NFT-pole spacing on the air-bearing surface was 30 nm. The wavelength of the light was assumed to be 830 nm. The media stack was 7.5 nm FePt/5 nm MgO/30 nm Cu/5 nm MgO/10 nm SUL/5 nm seed layer/glass substrate. The (complex) refractive index of FePt, MgO, Cu, SUL, seed layer and glass substrate were 2.4+j 3.2, 1.70, 0.26+j 5.29, 2.8+j 4.0, 1.09+j 3.75 and 1.50 respectively.

The first wrap layer was a low index $SiO_2$ layer 10 nm thick and having a index of refraction, n=1.46. The second wrap layer was a high index $Ta_2O_5$ layer 50 nm thick and having an index of refraction, n=2.09. This exemplar device is referred to in graphs as the Two Layer NPS (NFT-pole spacing). Two results are presented for the Two layer NPS, one with $Ta_2O_5$ as the CNS and one with $SiO_2$ as the CNS.

To demonstrate the effectiveness of the first wrap layer (10-nm thin SiO$_2$ layer), a device was modeled that replaced the 10-nm SiO$_2$ layer by a Ta$_2$O$_5$ layer of the same thickness. This comparative device is referred to in graphs as All Tantala.

Figure 4A:
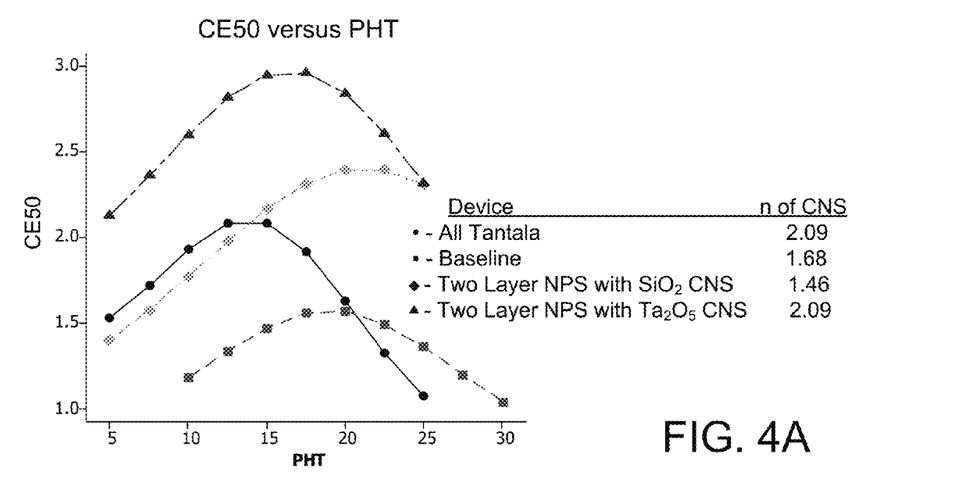
FIG. 4A is a graph showing results of modeling measuring CE50 (a measure of efficiency) versus the peg height (PHT) for various devices described below.

FIG. 4A shows the results of the modeling. CE50 was defined as the light absorption in the recording layer in a foot print of 50 nm by 50 nm square centered at the NFT peg. For comparison, a current baseline device (AlO as cladding, CNS has n=1.68, NPS is SiO) is also presented in the graphs. It can be seen that the Two Layer NPS (with either material as the CNS) yields the best NFT efficiency. An improvement of two times can be seen in CE50 from the baseline device to the Two Layer NPS with the Ta$_2$O$_5$ CNS, and a one and a half times improvement in the Two Layer NPS with the Ta$_2$O$_5$ CNS to All Tantala (highlighting the effect of the first wrap layer).

Figure 4B:
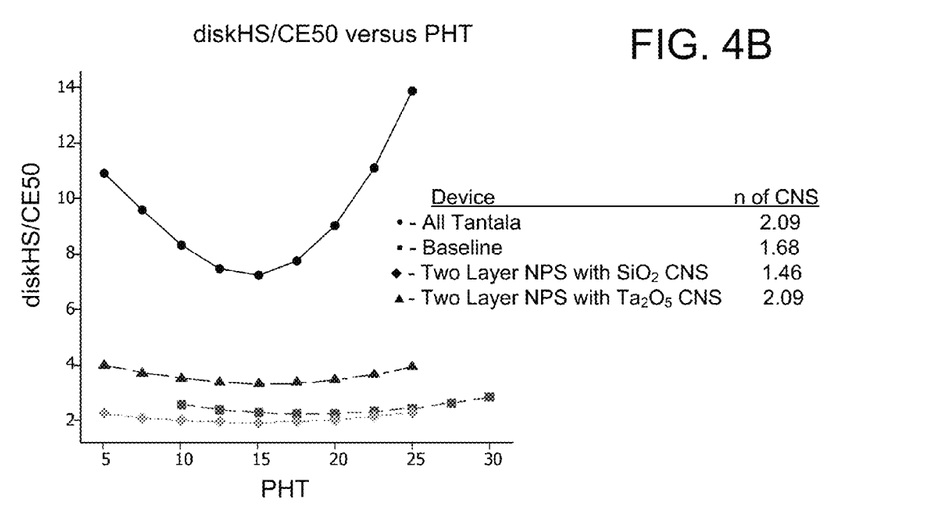
FIG. 4B is a graph showing results of modeling measuring disk HS/CE50 (a measure of light absorption) versus the peg height (PHT) for various devices described below.
Figure 4C:
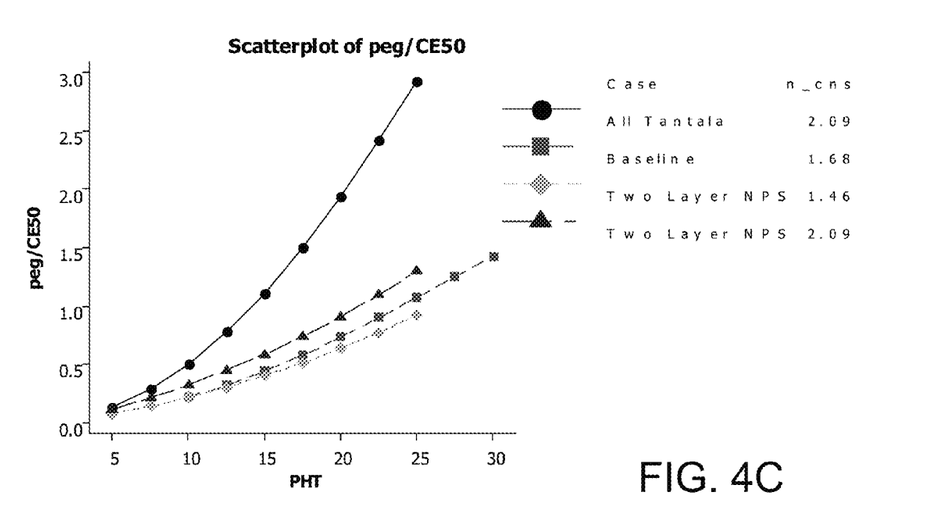
FIG. 4C is a graph showing results of modeling measuring peg/CE50 (a measure of light absorption) versus the peg height (PHT) for various devices described below.

Reliability can also be a concern in such devices. Reliability is related to light absorption in the NFT, in particular, in the NFT peg. FIG. 4B shows diskHS/CE50, ratio of the absorption of NFT disk and heat sink to CE50, versus peg height for various cases. FIG. 4C shows the peg absorption/CE50 versus the peg height for the various cases. As seen therein, the absorption of the disk and heat sink (diskHS) and the peg show the same trend, that is, the Two Layer NPS with SiO$_2$ CNS yields the lowest ratio of light absorption in the NFT to CE50. (NFT efficiency improvement is 60% from baseline to Two Layer NPS with SiO$_2$ CNS.) NFT absorption ratio is slightly higher for the Two Layer NPS with tantala CNS but it is much lower than that for All Tantala. At the same ratio of NFT absorption to CE50, the improvement in NFT efficiency is still close to 2× from baseline to Two Layer NPS with tantala CNS.

Figure 5:
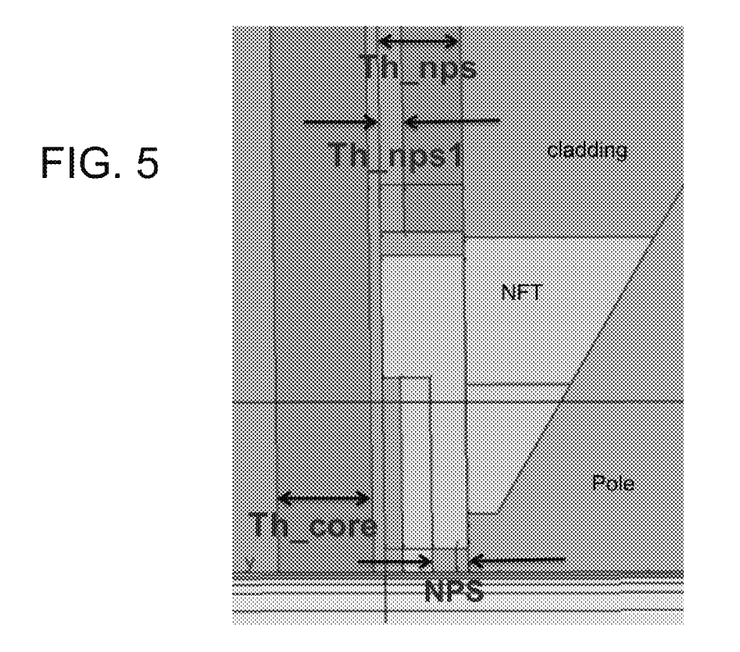
FIG. 5 depicts geometry that is utilized in the included modeling.

FIG. 5 shows an exemplary geometry utilized to run models using Comsol (Comsol, Inc. Burlington, Mass.) including both optical and thermal modeling. Comsol allows the attainment of initial optical modeling results which can then be feed into a thermal model within the same software to calculate media and head temperature distributions.

It should be noted that the geometry used here includes an extra chemical mechanical polishing (CMP) process to control the NFT to pole space (NPS), so that NFT disk is divided into two parts, with possible offsets between them. In FIG. 5, Th_core is the core thickness. Th_nps1 is the thickness of NPS1 layer, which can be considered a first wrap layer. Th_nps is the total thickness of NPS deposition after CMP (including NPS1 (first wrap layer) and NPS2 (second wrap layer)). The NFT material in this model was gold. The pole material was CoFe. The Core and NPS2 materials were Tantala. Other dieletrics, including bottom and top cladding, core to NFT spacing or CNS layer, and NPS1 layer, were silicon oxide.

Figure 6A:
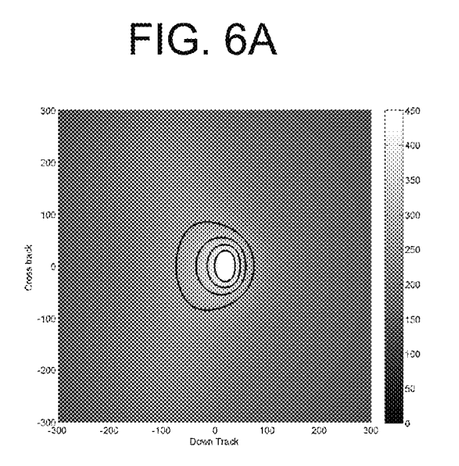
FIGS. 6A and 6B show the modeled temperature profile from the geometry of FIG. 5 with a single material in the NFT to pole space layer (FIG. 6A) and a disclosed first and second wrap layer (FIG. 6B).
Figure 6B:
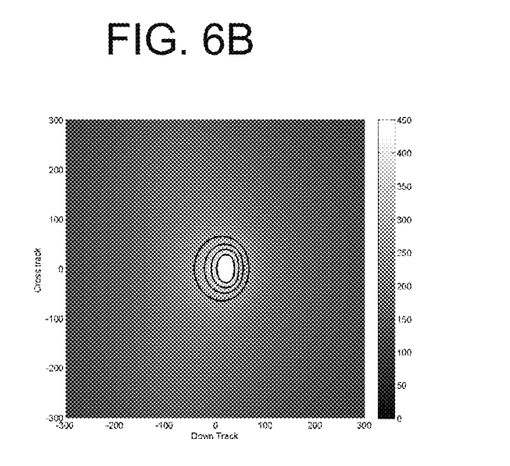

FIGS. 6A and 6B show temperature profiles in the (center layer of) media for the cases without a NFT wrap layer (single NPS layer) (FIG. 6A) and with a NFT wrap (dual NPS layers, with Th_nps1=10 nm, see FIG. 5) (FIG. 6B). (Note that the single NPS layer case has silicon oxide for the whole NPS layer.) Other features for the two cases are the same. In FIGS. 6A and 6B, the black lines are the contour for 60%, 70%, 80% and 90% of peak temperature rise. From a comparison of the two, it can be seen that the NFT spot size is smaller and the background temperature is lower (FIG. 6B) with the particular first and second wrap layers when compared to a NFT without the wrap layers (FIG. 6A).

Table 1 shows the media temperature rise for 1 mW (milliWatt) of input power (MT); the media to NFT peg temperature rise ratio (Mpeg); the media to pole temperature rise ratio (Mpole); the maximum temperature gradient for 450 degree media temperature rise (Tgmax); and the cross track width of the thermal profile at the specific percent (90%/80%/70%/60%) of media peak temperature rise.

TABLE 1

| Case | MT | Mpeg | Mpole | Tgmax | Cross Track Width (90/80/70/60) |
|---|---|---|---|---|---|
| Single Layer NPS | 64.6 | 7.894 | 8.259 | 4.819 | 59/82/110/170 |
| Dual Layer NPS | 72.0 | 5.879 | 5.874 | 5.472 | 57/77/98/130 |
| Difference | 11.3% | −25.5% | −28.9% | 13.6% | −4/−6/−10/−24% |

Among these metrics, MT is a measure of NFT efficiency; the higher the value of MT, the better the efficiency of the NFT. Tgmax is related to down track recording performance; the higher the value of Tgmax, the better the down track recording performance (a higher temperature gradient enables sharp transition and high linear density). Cross track width are related to cross track recording performance; the smaller the cross track width, the better the recording performance. Of the track widths at different percentage of peak temperature, the 80% and 90% contours are related to written track width, and the 60% and 70% contours are related to cross track erasure. Mpeg and Mpole are both measures of head reliability (peg and pole are two most vulnerable components of the head); and the higher those values are, the better the reliability.

From the table it can be seen that, the NFT wrap increases NFT efficiency (MT increases 11.3%) and both down track (Tgmax increase 13.6%) and cross track performance (cross track widths decrease). Specifically, the cross track width for 60% contour decreases 24%. This could significantly reduce cross track erasures. The table also shows that Mpeg and Mpole increase 25.5% and 28.9% respectively, indicating a potential reliability penalty. This can be considered the price for the increased performance.

Thus, embodiments of optical devices including layers that wrap the near field transducer (NFT) are disclosed. The implementations described above and other implementations are within the scope of the following claims. One skilled in the art will appreciate that the present disclosure can be practiced with embodiments other than those disclosed. The disclosed embodiments are presented for purposes of illustration and not limitation.

In the preceding description, reference is made to the accompanying set of drawings that form a part hereof and in which are shown by way of illustration several specific embodiments. It is to be understood that other embodiments are contemplated and may be made without departing from the scope or spirit of the present disclosure. The preceding detailed description, therefore, is not to be taken in a limiting sense.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the properties sought to be obtained by those skilled in the art utilizing the teachings disclosed herein.

The recitation of numerical ranges by endpoints includes all numbers subsumed within that range (e.g. 1 to 5 includes 1, 1.5, 2, 2.75, 3, 3.80, 4, and 5) and any range within that range.

As used in this specification and the appended claims, the singular forms "a", "an", and "the" encompass embodiments having plural referents, unless the content clearly dictates otherwise. As used in this specification and the appended claims, the term "or" is generally employed in its sense including "and/or" unless the content clearly dictates otherwise.

"Include," "including," or like terms means encompassing but not limited to, that is, including and not exclusive. It should be noted that "top" and "bottom" (or other terms like "upper" and "lower") are utilized strictly for relative descriptions and do not imply any overall orientation of the article in which the described element is located.

What is claimed is:

1. A device having an air bearing surface (ABS), the device comprising:
   a near field transducer (NFT), the NFT having at least a portion thereof at the ABS;
   a first wrap layer, the first wrap layer surrounding at least a portion of the NFT, the first wrap layer having a thickness of not greater than about 30 nanometers (nm), and the first wrap layer comprising a material that has a refractive index (n) that is not greater than 2.0;
   a second wrap layer, the second wrap layer surrounding at least a portion of the first wrap layer, the second wrap layer having a thickness that is not greater than 100 nm, and the second wrap layer comprising a material that has a refractive index (n) that is at least about 1.9; and
   a top cladding layer surrounding at let a portion of the second wrap layer, the top cladding layer comprising a material that has a refractive index (n) that is not greater than 2.0.

2. The device according to claim 1, wherein the NFT is a peg/disc type NFT.

3. The device according to claim 2, wherein the NFT is configured with a heat sink and the first wrap layer also surrounds the heat sink.

4. The device according to claim 1 further comprising a waveguide core layer, wherein the waveguide core layer comprises a material that has an index of refraction between about 1.9 and 4.0.

5. The device according to claim 4, wherein the waveguide core layer is adjacent to the NFT.

6. The device according to claim 5, wherein there is a space between the waveguide core layer and the NFT.

7. The device according to claim 5, wherein the first wrap layer surrounds all of the NFT except the side by the waveguide core layer.

8. The device according to claim 1, wherein the first wrap layer has a thickness from about 10 nm to about 30 nm.

9. The device according to claim 1, wherein the first wrap layer comprises $SiO_2$, $MgF_2$, $Al_2O_3$, $Y_2O_3$, $AlN_x$, porous silica, or combinations thereof.

10. The device according to claim 1, wherein the second wrap layer has a thickness from about 30 nm to about 100 nm.

11. The device according to claim 1, wherein the second wrap layer comprises $Ta_2O_5$, $SiON_x$, $SiOTa_x$, $Y_2O_3$, Si, or combinations thereof.

12. A device having an air bearing surface (ABS), the device comprising:
   a near field transducer (NFT), the NFT having at least a portion thereof at the ABS;
   a waveguide core layer adjacent at least the NFT, the core layer comprising a material that has an index of refraction between about 1.9 and 4.0;
   a first wrap layer, the first wrap layer surrounding at least a portion of the NFT, the first wrap layer having a thickness of not greater than about 30 nanometers (nm), and the first wrap layer comprising a material that has a refractive index (n) that is not greater than 2.0;
   a second wrap layer, the second wrap layer surrounding at least a portion of the first wrap layer, the second wrap layer having a thickness that is not greater than 100 nm, and the second wrap layer comprising a material that has a refractive index (n) that is greater than that of the material of the first wrap layer; and
   a top cladding layer surrounding at least a portion of the second wrap layer, the top cladding layer comprising a material that has a refractive index (n) that is not greater than 2.0.

13. The device according to claim 12, wherein the first wrap layer has a thickness from about 10 nm to about 30 nm.

14. The device according to claim 12, wherein the first wrap layer comprises $SiO_2$, $MgF_2$, $Al_2O_3$, $Y_2O_3$, $AlN_x$, porous silica, or combinations thereof.

15. The device according to claim 12, wherein the first wrap layer comprises $SiO_2$.

16. The device according to claim 12, wherein the second wrap layer has a thickness from about 30 nm to about 100 nm.

17. The device according to claim 12, wherein the second wrap layer comprises $Ta_2O_5$, $SiON_x$, $SiOTa_x$, $Y_2O_3$, Si, or combinations thereof.

18. The device according to claim 12, wherein the second wrap layer comprises $Ta_2O_5$.

19. A device having an air bearing surface (ABS), the device comprising:
   a near field transducer (NFT), the NFT having at least a portion thereof at the ABS;
   a waveguide core layer adjacent at least the NFT, the core layer comprising a material that has an index of refraction between about 1.9 and 4.0;
   a core-NFT space positioned between the NFT and the core layer;
   a first wrap layer, the first wrap layer having a thickness of not greater than about 30 nanometers (nm), the first wrap layer comprising a material that has a refractive index (n) that is not greater than 2.0, and the first wrap layer surrounding all of the NFT except the side by the waveguide core layer;
   a second wrap layer, the second wrap layer surrounding at least a portion of the first wrap layer, the second wrap layer having a thickness that is not greater than 100 nm, and the second wrap layer comprising a material that has a refractive index (n) that is greater than that of the material of the first wrap layer; and
   a top cladding layer surrounding at least a portion of the second wrap layer, the top cladding layer comprising a material that has a refractive index (n) that is not greater than 2.0.

20. The device according to claim 19, wherein the first wrap layer has a thickness from about 10 nm to about 30 nm, and the second wrap layer has a thickness from about 30 nm to about 100 nm.

* * * * *